United States Patent
Shih

(10) Patent No.: US 7,684,015 B2
(45) Date of Patent: Mar. 23, 2010

(54) SYSTEM AND METHOD FOR CLOCK SYNCHRONIZATION AND POSITION DETERMINATION USING ENTANGLED PHOTON PAIRS

(75) Inventor: Yanhua Shih, Ellicott City, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 726 days.

(21) Appl. No.: 11/079,266

(22) Filed: Mar. 15, 2005

(65) Prior Publication Data
US 2005/0199812 A1 Sep. 15, 2005

Related U.S. Application Data

(60) Provisional application No. 60/553,217, filed on Mar. 15, 2004.

(51) Int. Cl.
*G01C 3/08* (2006.01)
(52) U.S. Cl. .................. 356/4.01; 356/5.01; 250/338.1; 250/340; 368/47; 375/355
(58) Field of Classification Search ................ 356/4.01; 250/338.1
See application file for complete search history.

(56) References Cited

U.S. PATENT DOCUMENTS

| | | | | |
|---|---|---|---|---|
| 6,424,665 | B1 * | 7/2002 | Kwiat et al. | 372/21 |
| 6,473,719 | B1 * | 10/2002 | Steenblik | 702/181 |
| 7,072,432 | B2 * | 7/2006 | Belcea | 375/356 |
| 7,286,444 | B1 * | 10/2007 | Bahder et al. | 368/47 |
| 2002/0097874 | A1 * | 7/2002 | Foden et al. | 380/256 |
| 2003/0133714 | A1 * | 7/2003 | Gat | 398/140 |

OTHER PUBLICATIONS

Preskill, John, "Quantum clock synchronization and quantum error correction", (Caltech, IQI) Oct 2000, 8pp. http://arxiv.org/abs/quant-ph/0010098 e-Print: quant-ph/0010098.*

* cited by examiner

*Primary Examiner*—Isam Alsomiri
*Assistant Examiner*—Timothy A Brainard
(74) *Attorney, Agent, or Firm*—René A. Vazquez

(57) ABSTRACT

A system and method for clock synchronization and position determination using entangled photon pairs is provided. The present invention relies on the measurement of the second order correlation function of entangled states. Photons from an entangled photon source travel one-way to the clocks to be synchronized. By analyzing photon registration time histories generated at each clock location, the entangled states allow for high accuracy clock synchronization as well as high accuracy position determination.

21 Claims, 7 Drawing Sheets

SYSTEM AND METHOD FOR CLOCK SYNCHRONIZATION AND POSITION DETERMINATION USING ENTANGLED PHOTON PAIRS

REFERENCE TO RELATED APPLICATIONS

This application claims priority to U.S. Provisional Patent Application No. 60/553,217 filed Mar. 15, 2004, which is incorporated herein by reference in its entirety.

GOVERNMENT RIGHTS

This invention was made with Government support under Grant No. N00014-91-J1430 awarded by the Office of Naval Research, and Grant No. NAG5-12227 awarded by NASA-CASPR. The Government has certain rights in this invention.

BACKGROUND OF THE INVENTION

1. Field of the Invention

This invention relates to clock synchronization and position determination and, more specifically, to a system and method for accurate one way clock synchronization and position determination using entangled photon pairs.

2. Background of the Related Art

Accurate timing and positioning metrological measurements are important for both fundamental research and practical applications. In particular, distant clock synchronization has attracted a great deal of attention in recent years due to its essential role in the Global Positioning system (GPS) and telecommunications.

Modern clocks have been improved to such a level, that the resolution and accuracy of the comparison techniques have become the limiting factors to determine their relative rates and synchronization. There are two standard methods for synchronizing two distant clocks: the classic Einstein protocol and the Eddington slow transportation method. Both methods have certain limitations and difficulties in high accuracy nonlocal synchronization in which relativistic effects, such as the rotating disk problem, have to be taken into consideration. The Einstein protocol is a two-way method and, hence, it requires (1) an accurate knowledge of the one-way speed of light that, until now, has not been measured conclusively on rotating reference systems and (2) the light propagation path to be the same in each direction. The Eddington transportation method relies on the physical movement of a clock, therefore, this method is not practical for space applications.

SUMMARY OF THE INVENTION

An object of the invention is to solve at least the above problems and/or disadvantages and to provide at least the advantages described hereinafter.

Therefore, an object of the present invention is to provide high accuracy one-way synchronization of clocks using entangled photon pairs.

Another object of the present invention is to provide high accuracy position determination using entangled photon pairs.

To achieve the at least above objects, in whole or in part, there is provided a system for clock synchronization and position determination, including an entangled photon source for generating entangled photon pairs and associated quantum mechanical probability amplitudes of directing one of the photons in each pair to a first clock positioned at a first location and the other photon in the pair to a second clock positioned at a second location, and a processor for synchronizing the first and second clocks and/or determining an unknown distance using information on arrival times of the photons at the first and second clocks.

To achieve at least the above objects, in whole or in part, there is further provided a system for clock synchronization and position determination, including an entangled photon source for generating entangled photon pairs and associated quantum mechanical probability amplitudes of directing one of the photons in each pair to a first clock positioned at a first location and the other photon in the pair to a second clock positioned at a second location, a first detector at the first location for detecting one of the photons in each pair, a first event timer in communication with the first clock and the first detector for determining arrival times of the photons at the first detector and generating a first detection event history, a second detector at the first location for detecting the other photons in each pair, a second event timer in communication with the second clock and the second detector for determining arrival times of the photons at the second detector and generating a second detection event history, and a processor for synchronizing the first and second clocks and/or determining an unknown distance using the first and second detection event histories.

To achieve at least the above objects, in whole or in part, there is further provided a method for determining a synchronization state between a first clock at a first location and a second clock at a second location, including generating a plurality of entangled photon pairs and associated quantum mechanical probability amplitudes of directing one of the photons in each pair to a first clock positioned at a first location and the other photon in the pair to a second clock positioned at a second location, generating a first detection event history based on arrival times of the photons at the first location, generating a second detection event history based on arrival times of the photons at the second location, and determining if the first and second clocks are synchronized based on a comparison of the first and second detection event histories.

To achieve at least the above objects, in whole or in part, there is further provided a method of synchronizing a first clock at a first location and a second clock at a second location, including generating a plurality of entangled photon pairs and associated quantum mechanical probability amplitudes of directing one of the photons in each pair to a first clock positioned at a first location and the other photon in the pair to a second clock positioned at a second location, detecting one of the photons from a first photon pair with wavelength $\lambda_s$ ("photon 1A") at the first location and detecting the other photon from the first photon pair with wavelength $\lambda_i$ ("photon 2A") at the second location, determining a first registration time difference based on arrival times of photons 1A and 2A at the first and second locations, respectively, detecting a first photon from a second photon pair with wavelength $\lambda_s$ ("photon 1B") at the second location and the other photon from the second photon pair with wavelength $\lambda_i$ ("photon 2B") at the first location, determining a second registration time difference based on arrival times of photons 1B and 2B at the second and first locations, respectively, subtracting the second registration time difference from the first registration time difference to yield an intermediate result, determining a time offset based on the intermediate result, and synchronizing the first and second clocks using the time offset.

To achieve at least the above objects, in whole or in part, there is further provided a method for determining a distance between a first location and a second location, wherein a first clock is located at the second location and a second clock is located at a third location, including generating a plurality of entangled photon pairs at the first location and associated quantum mechanical probability amplitudes of directing one of the photons in each pair to a first clock positioned at a second location and the other photon in the pair to a second clock positioned at a third location, detecting a first photon from a first photon pair with wavelength $\lambda_s$ ("photon 1A") at the second location and detecting the other photon from the first photon pair with wavelength $\lambda_i$ ("photon 2A") at the third location, determining a first registration time difference based on arrival times of the photons 1A and 2A at the second and third locations, respectively, detecting a first photon from a second photon pair with wavelength $\lambda_s$ ("photon 1B") at the third location and the other photon from the second photon pair with wavelength $\lambda_i$ ("photon 2B") at the second location, determining a second registration time difference based on arrival times of photons 1B and 2B at the third and second locations, respectively, subtracting the second registration time difference from the first registration time difference to yield an intermediate result, determining a time offset based on the intermediate result, and determining the distance between the first location and the second location based on the intermediate result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, wherein.

DETAILED DESCRIPTION OF PREFERRED EMBODIMENTS

Figure 1:
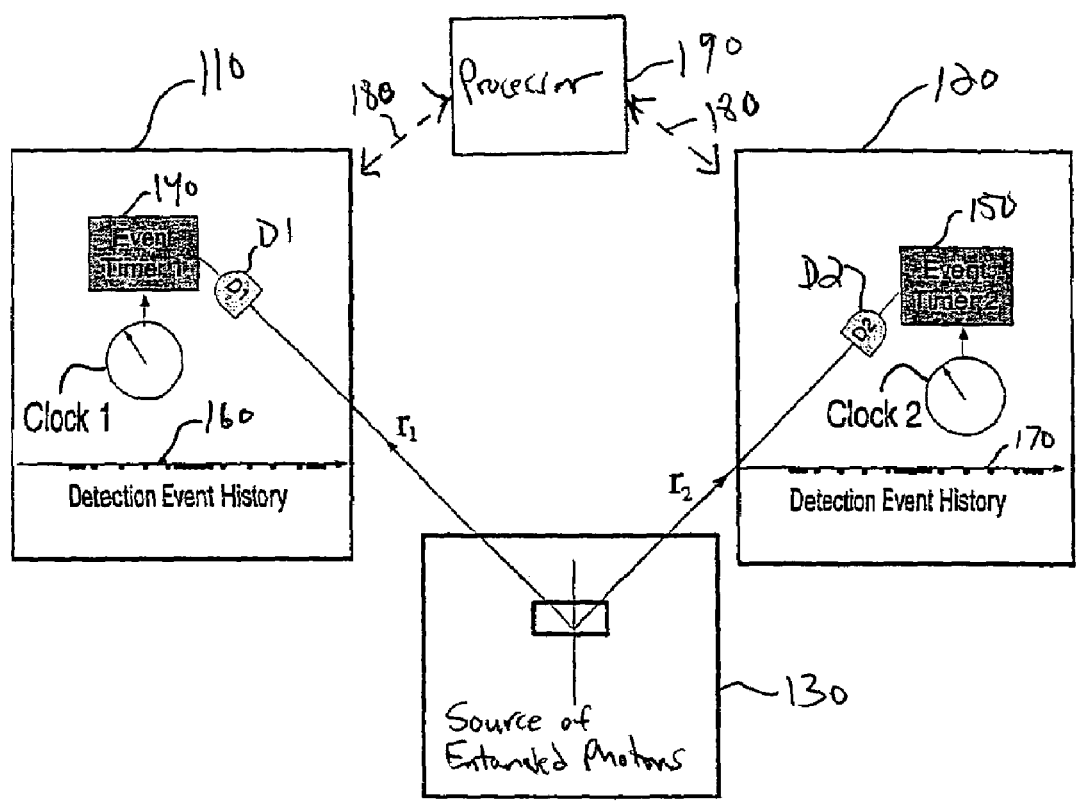
FIG. 1 is a schematic diagram of a clock synchronization system, in accordance with the present invention.

The system and method of the present invention relies on the measurement of the second order correlation function of entangled states. In a preferred embodiment, the entangled photon pairs produced in a continuous wave (CW) pumped spontaneous parametric down conversion (SPDC) are utilized for clock synchronization and position determination.

Generally, the process of SPDC involves sending a pump laser beam into a nonlinear material, such as a non-centrosymmetric crystal. Occasionally, the nonlinear interaction inside the crystal leads to the annihilation of a high frequency pump photon and the creation of two lower frequency photons named as signal and idler. The creation time of either the signal photon or the idler photon is unknown. However, if the signal photon is detected at a certain time, the detection time of the idler photon can only happen at a unique precise time. In a performed experiment, which will be discussed in more detail below, both the signal photon and the idler photon are in the form of continuous wave, i.e., $\Delta t = \infty$. Nevertheless, the time correlation measurement of the signal/idler at distance of 3 km has shown uncertainty in the order of a picosecond.

According to quantum field theory, the probability of having a joint photo-detection even at space-time points $(r_1, t_1)$ and $(r_2, t_2)$ is proportional to the second-order correlation function of the fields as follows:

$$G^{(2)}(r_1,t_1;r_2,t_2) = \langle E^{(-)}(r_1,t_1)E^{(-)}(r_2,t_2)E^{(+)}(r_2,t_2)E^{(+)}(r_1,t_1)\rangle \times E^{(+)}(r_1,t_1)\rangle, \quad (1)$$

where $E^{(-)}$ and $E^{(+)}$ are the negative-frequency and the positive-frequency field operators of the detection events at space-time points $(r_1, t_1)$ and $(r_2, t_2)$. For the two-photon entangled state of SPDC, $G^{(2)}(r_1, t_1; r_2, t_2)$ can be written as the modulus square of a two-photon effective wavefunction, or biphoton:

$$G^{(2)}(r_1,t_1;r_2,t_2) = |\langle 0|E^{(+)}(r_2,r_2)E^{(+)}(r_1,t_1)|\Psi\rangle|^2 \equiv |\psi(r_1, t_1;r_2,t_2)|^2 \quad (2)$$

where $|0\rangle$ stands for the vacuum, and $|\Psi\rangle$ is the state of the signal/idler photon pair.

The two-photon effective wavefunction is calculated to be:

$$\Psi(r_1, t_1; r_2, t_2) = e^{-i(\omega_s^0 r_1 + \omega_i^0 r_2)} F_{r_1-r_2}\{f(\Omega)\} \quad (3)$$

where $F_{r_1-r_2}\{f(\Omega)\}$ is the Fourier transform of the spectrum amplitude function $f(\Omega)$, $r_j = t_j - \tau_j/u_j$, $j=1,2$, and $u_j$ is the group velocity at frequencies $\omega_s^0$ and $\omega_i^0$ along the optical paths 1 and 2, respectively $\omega_s^0$ and $\omega_i^0$ are the control frequencies of the signal/idler radiation field.

The $G^{(2)}(r_1,t_1;r_2,t_2)$ function for the two-photon entangled state of SPDC is thus $$G^{(2)}(r_1,t_1;r_2,t_2) = |F_{r_1-r_2}\{f(\Omega)\}|^2. \quad (4)$$

This function, depending on $\tau_1 - \tau_2$, is independent of the chosen reference coordinates—it is a Lorentz invariant. The spectrum amplitude function of the SPDC, $f(\Omega)$, provides all the information about the spectrum and the correlation properties of the signal/idler pair. In the collinear case, for type-II and nondegenerate type-I SPDC, the spectral function is calculated as $f(\Omega) \sim \text{sinc}(DL\Omega/2)$, where L is the length of the crystal and $$D = \frac{1}{u_s} - \frac{1}{u_i}$$

is the inverse group velocity difference for the signal and idler. For an 8 mm LBO crystal pumped at 458 nm (type-II), the estimated width of $G^{(2)}(t_1-t_2)$ is about 800 femtoseconds. For collinear degenerate type-I SPDC, the spectral function is $f(\Omega) \sim \text{sinc}(D''L\Omega^2/2)$, where D" is the second derivative of the dispersion function of the nonlinear material. In this case, the width of $G^{(2)}(t_1-t_2)$ is about 30 femtoseconds for the same size LBO crystal. Typical values for the natural width of $G^{(2)}$ for SPDC are, then, on the order of a few femtoseconds to hundreds of femtoseconds. If $r_1$ and $r_2$ are well controlled, the measurement of $t_1-t_2$ can reach, in principle, the same order of resolution, making SPDC particularly suitable for implementing protocols for timing and positioning measurements with ultra high accuracy.

FIG. 1 is a schematic diagram of a clock synchronization system, in accordance with the present invention. In the example shown, two clocks, clock 1 and clock 2, are located at separate locations. Specifically, clock 1 is located at the first location 110, and clock 2 is located at a second location 120. An entangled photon source 130 generates entangled photon pairs and the quantum mechanical probability amplitude of directing one of the photons in the pair to clock 1 and the other photon in the pair to clock 2.

A photon counting detector D1 and an event timer 140 are used to detect photons at location 110. Similarly, a photon counting detector D2 and an event timer 150 are used to detect photons at location 120. The photon registration times of the detectors, $t_1$ and $t_2$, are recorded by two event timers 140 and 150, whose time bases are provided by clock 1 and clock 2, respectively. The individual detection event histories 160 and 170 are sent to a processor 190, preferably through classical communication channels 180 for comparison. The processor 190 can be located at a location separate from locations 110 and 120, or can be located at either location 110 or 120. If clock 1 and clock 2 are synchronized, the joint detection of the entangled photon pair obtained by matching the detection event history records 160 and 170 will show maximum "coincidences". If the clocks lose their synchronization, one has to rematch the detection event history records 160 and 170 to achieve maximum coincidences by shifting one of them by a certain amount. The amount that one of the records needs to be shifted with respect to the other corresponds to how much the two clocks have lost their synchronization. The clocks can be adjusted and kept synchronized accordingly.

The processor 190 can be a general purpose computer. However, it can also be a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of executing code can be used to implement the processor 190.

Communications channels 180 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, and ATM (Asynchronous Transfer Mode) connection, or an FDDI (Fiber Distributed Data Interface) or CDDI (Copper Distributed Data Interface) connection. Communications channels 180 may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link such as a cellular phone channel, a GPS (Global Positioning System) link, CDPD (Cellular Digital Packet Data), a RIM (Research in Motion, Limited) duplex paging type device, a Bluetooth radio link, or an IEEE 802.11-based radio frequency link. Communications channels 180 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Figure 2:
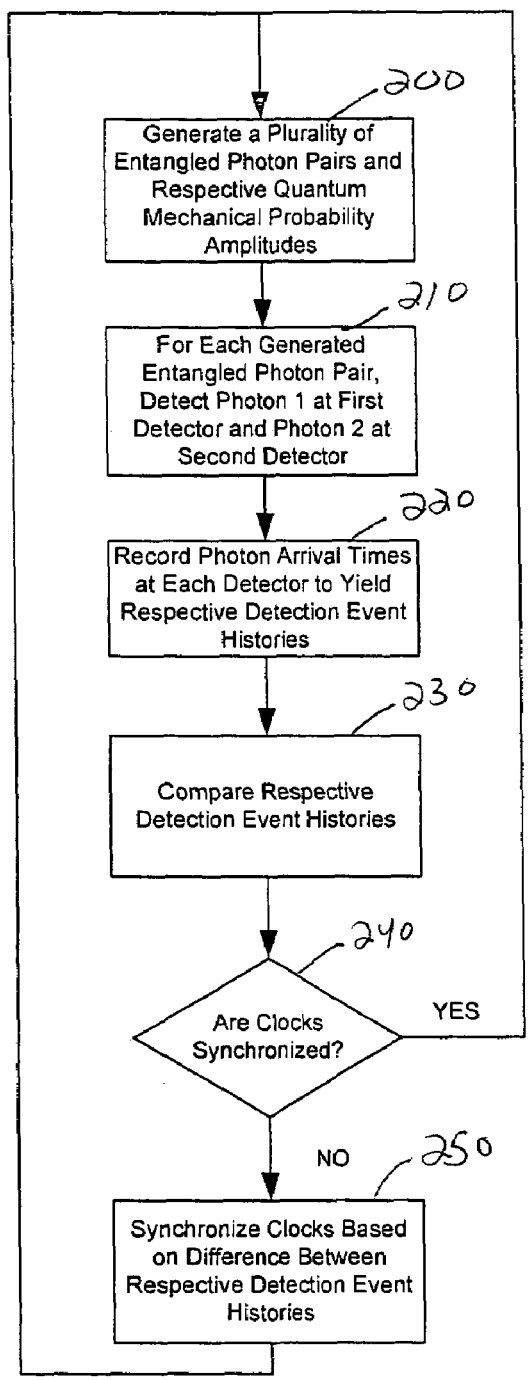
FIG. 2 is a flowchart of a method for maintaining at least two clocks synchronized after they have been initially synchronized, in accordance with the present invention.

FIG. 2 is a flowchart of a method for maintaining at least two clocks synchronized after they have been initially synchronized (a method for initially synchronizing the at least two clocks will be described in connection with FIG. 3 below). The method starts at step 200, where a plurality of entangled photon pairs, along with the quantum mechanical probability amplitude of directing one of the photons in the pair to clock 1 and the other photon in the pair to clock 2, are generated using the source of entangled photons 130. The method then moves to step 210, where one of the photons in a photon pair (termed "photon 1") is detected at the first detector D1 and the other photon in the pair (termed the "photon 2") is detected at the second detector D2. It should be appreciated that it does not matter which detector receives photon 1 and which detector receives photon 2. Thus, the first detector D1 could receive photon 2 and the second detector D2 could receive photon 1.

At step 220, the photon arrival times at each detector are recorded by respective event timers 140 and 150 to yield respective detection event histories 160 and 170. Next, at step 230, the respective detection event histories 160 and 170 are compared. Then, at step 240, it is determined whether the clocks are synchronized based on the comparison of the respective detection event histories 160 and 170. If the clocks are synchronized, the method returns to step 200. If the clocks are not synchronized, the method proceeds to step 250, where the clocks are synchronized based on a difference between respective detection event histories 160 and 170. This is preferably done by shifting the detection event timing history of one of the clocks with respect to the other by an amount sufficient to achieve maximum coincidences between the respective detection event histories 160 and 170. The method then returns to step 200.

Figure 3:
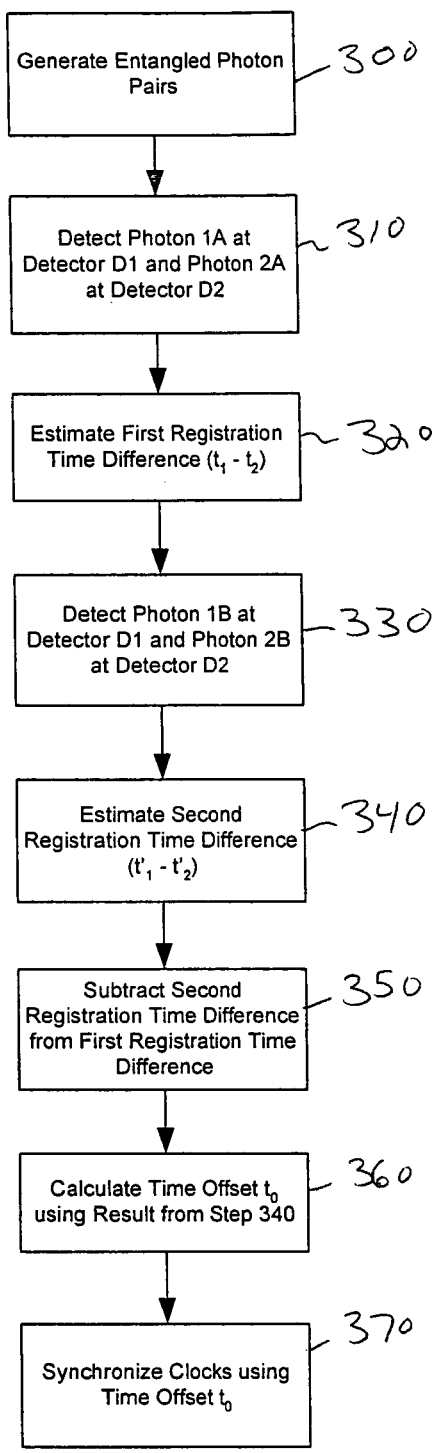
FIG. 3 is a flowchart of a method for initially synchronizing two clocks, in accordance with the present invention.

FIG. 3 is a flowchart of a method for initially synchronizing the two clocks shown in FIG. 1. The method starts at step 300, at which entangled photon pairs, along with the quantum mechanical probability amplitude of directing one of the photons in a pair to clock 1 and the other photon in a pair to clock 2, are created using the entangled photon source 130. The method then proceeds to step 310, at which one of the photons in a pair, termed "photon 1A" (with wavelength $\lambda_s$) is detected at detector $D_1$ and other photon of the pair, termed the "photon 2A" (with wavelength $\lambda_i$) is detected at detector $D_2$.

Then, at step 320, the registration time difference, $t_1-t_2$, at $D_1$ and $D_2$ is estimated as:

$$t_1 - t_2 = \frac{r_1}{u_s} + t_0 - \frac{r_2}{u_i} \qquad (5)$$

where $t_0$ is the time offset of the non-synchronized clocks. Then, at step 330, photon 1B (with wavelength $\lambda_s$) from a second photon pair is detected at $D_2$ and photon 2B from the second photon pair (with wavelength $\lambda_i$) is detected at $D_1$. It should be appreciated that, due to the quantum mechanical probability amplitudes of directing one of the photons in a pair to clock 1 and the other photon in a pair to clock 2, the second photon pair detected at clocks 1 and 2 is not necessarily the photon pair that is generated immediately after the previously detected photon pair. The registration time difference, $t'_1-t'_2$, of $D_1$ and $D_2$ is the calculated at step 340 as:

$$t'_1 - t'_2 = \frac{r_1}{u_s} + t_0 - \frac{r_2}{u_s} \qquad (6)$$

At step 350, the registration time differences calculated at step 330 is subtracted from the registration time difference calculated at step 320 to yield:

$$\Delta t_- = (t_1 - t_2) - (t'_1 - t'_2) = D(r_1 + r_2) \quad (7)$$

where $$D = \frac{1}{u_s} - \frac{1}{u_i},$$

$\Delta t_-$ is obtained from direct measurements, and $r_2$ is known. In some cases, D is known or independently measurable, therefore the distance between location 110 and the entangled photon source 130, $r_1$, is predictable through the measurements of $\Delta t_-$. In other cases, $r_1$ may be given or independently measurable, so, the value of D can be calibrated in the above procedure with ultra-high accuracy.

In both cases, the time offset t0 is estimated at step 350 by substituting into either Eq. (5) or Eq.(6). The accuracy of the estimated time offset t0 is of the same order as the accuracy of the measurement $t_1-t_2$. At step 370, clock 1 and clock 2 are synchronized using the estimated time offset $t_0$. The measurement can be repeated for different frequencies and different values of $r_2$. Thus, even in the case in which both D and $r_1$ are unknown, measurements of $\Delta t_-$ with different known values of $r_2$ allow the evaluation of D and $r_1$ simultaneously.

As discussed above, at least one of the distances $r_1$ or $r_2$ must be known in order to synchronize the clocks. However, the method of the present invention can also be used to determine the sum of two unknown distances ($r_1$ or $r_2$) or one of the unknown distances, $r_1$ or $r_2$, if the other is known using the method shown in FIG. 4.

Figure 4:
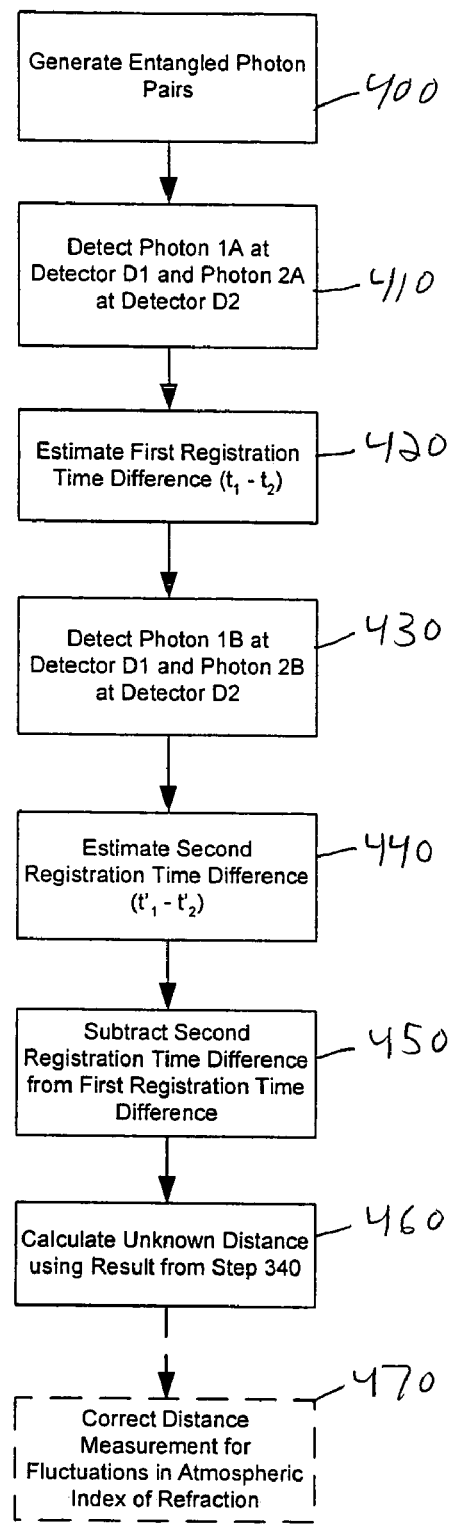
FIG. 4 is a flowchart of a method of determining an unknown distance, in accordance with the present invention.

Steps 400-450 of the method of FIG. 4 are identical to steps 300-350 of the method of FIG. 3, and thus they will not be described again. At step 460, the unknown distance is calculated using the result from step 450. As discussed above, the unknown distance could be the sum of two unknown distances ($r_1$ or $r_2$) or one of the unknown distances, $r_1$ or $r_2$, if the other is known. If desired, one could also optionally correct the distance measurement for fluctuations in the atmospheric index of refraction using optional step 470. Any known techniques for making such correction, such as multi-color ranging techniques, can be used for correcting the distance measurement for fluctuations in the atmospheric index of refraction.

Figure 5:
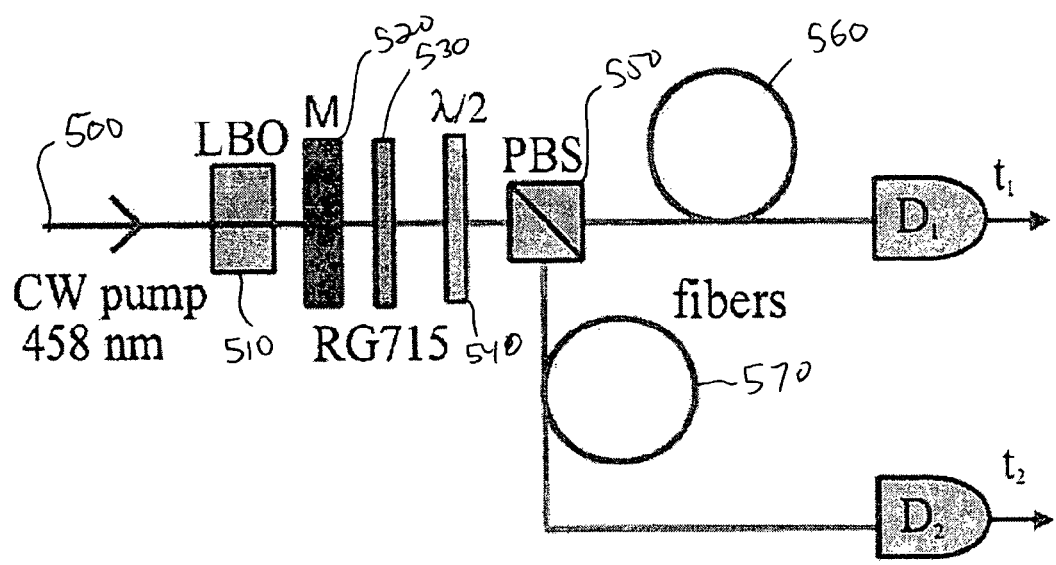
FIG. 5 is a schematic diagram of an experimental setup used to synchronize two clocks using entangled photon pairs, in accordance with the present invention.

An experimental demonstration was performed in the case in which $r_1$ and $r_2$ were known. In the experiment, long optical fibers of known lengths were used to simulate long distances to a remote location. The experimental setup is shown in FIG. 5. A single frequency Ar$^+$ laser line 500 at a wavelength of 457.9 nm was used to pump an 8 mm LBO crystal 510 for type-II SPDC. The signal/idler radiations (centered at ~901 nm and at ~931 nm, respectively) were separated from the pump laser beam 500 by using filtering devices 520 and 530. Filter device 520 is preferably a a high reflectivity laser cavity mirror to block the pump beam, and filtering device 530 is preferably a band-cut filter to further block the remaining pump beam. The orthogonally polarized signal/idler pair was split by means of a polarizing beam splitter 550. Before the beam splitter 550, a half-wave plate 540 was positioned in order to perform the two measurements described previously. When the waveplate 540 is at 0°, the signal is transmitted to $D_1$ and the idler reflected to $D_2$. When the waveplate 540 is at 45°, the idler is transmitted to $D_1$ and the signal is reflected to $D_2$.

In both measurements, the signal and idler radiation were fed into two 1.5 km-long commercial optical fibers 560 and 570 optimized for single-mode operation at 1300 nm. The signal/idler pair was then detected by two-single photon counting detectors D1 and D2. After a large number of signal/idler pair measurements, a histogram of the number of counts against $t_1-t_2$ (the resolution of the fast-timing electronics is 3 ps) can be obtained. This distribution function corresponds to the $G^{(2)}(t_1-t_2)$ function previously described.

Figure 6:
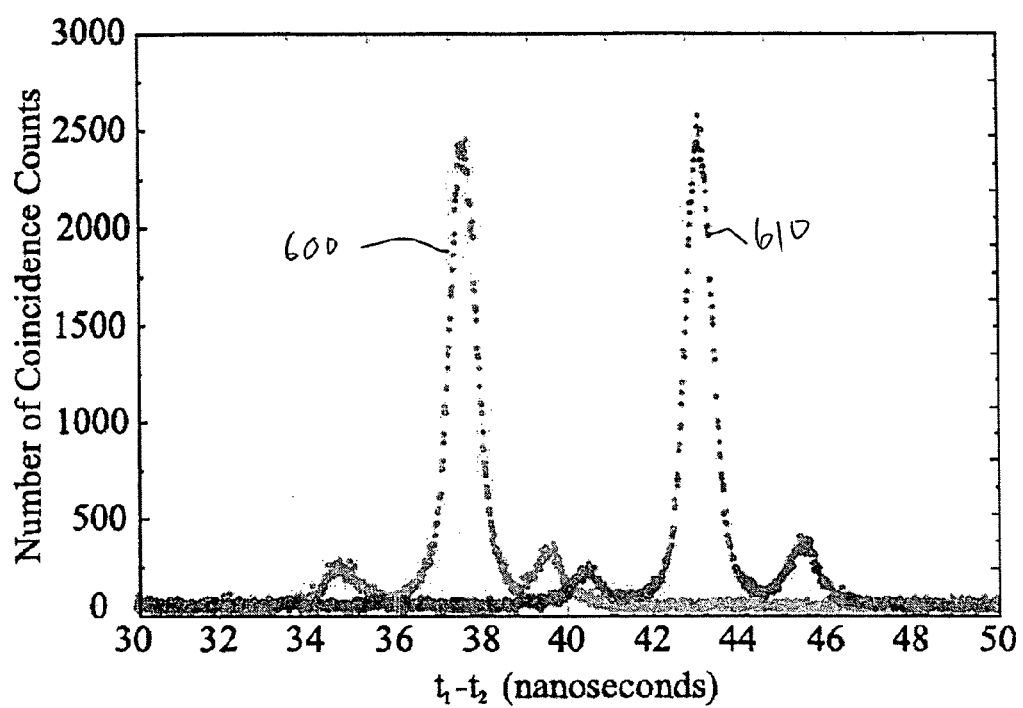
FIG. 6 is a plot of experimental results obtained using the experimental setup of FIG. 5.

FIG. 6 is a plot of the experimental results. The left distribution function 600 corresponds to the case of signal-$D_1$ and idler-$D_2$ (half-wave plate 540 at 0°), while the right distribution function 610 corresponds to the case of idler-$D_1$ and signal-$D_2$ (half-wave plate 540 at 45°). The presence of multiple peaks on each individual distribution function is a consequence of intermodal dispersion in the optical fibers 560 and 570, which is a known effect in fiber optics.

The calculated width of the effective two-photon wavefunction from a 8 mm type-II LBO SPDC, without the long optical fibers, is about 800 fs. The measured width of $G^{(2)}(t_1-t_2)$, with the fibers, is around 750 ps. There are two contributions for the broadening of the $G^{(2)}$ function: (i) dispersion in the optical fiber, which may be compensated nonlocally (the compensation is not included in this proof-of-principle experiment); and (ii) the time jitter of the photodetectors D1 and D2. The behavior of the biphoton in dispersive medium has been previously studied. Using two fibers of 1.5 km length, the far-field zone condition is satisfied. Therefore, $G^{(2)}(t_1-t_2)$ is expected to take the shape of the spectrum function of the type-II SPDC $|f(\Omega)|$ with a full width at half maximum of 600 ps.

Figure 7:
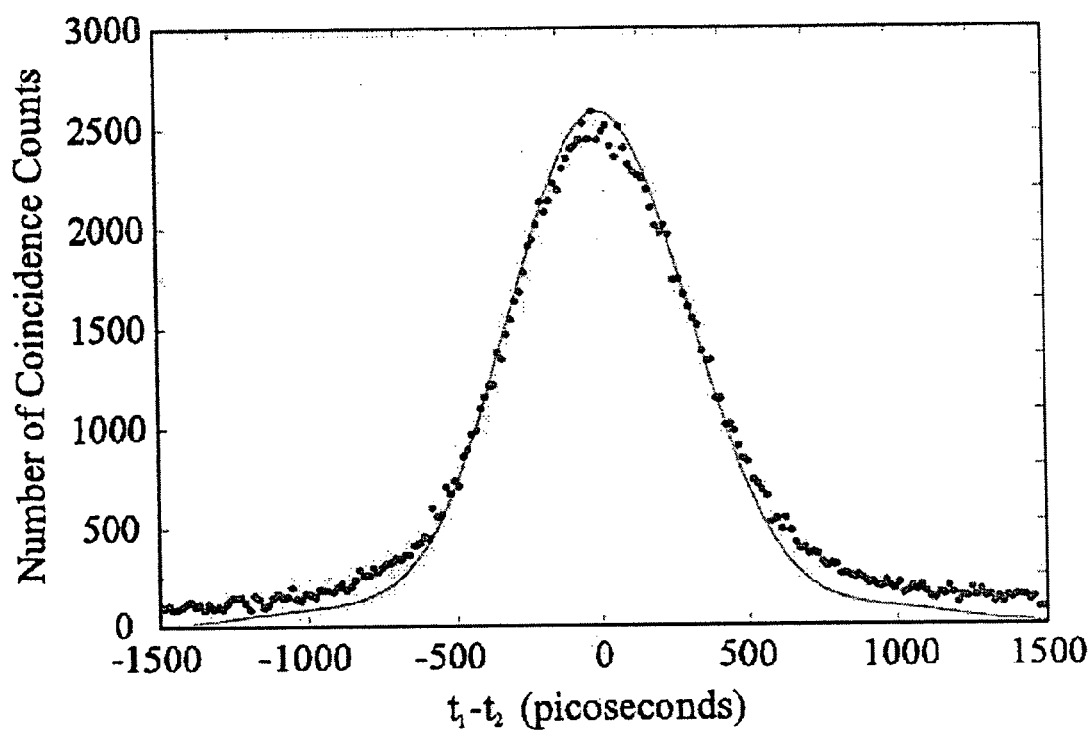
FIG. 7 is a plot showing a central peak of the experimental data obtained using the experimental setup of FIG. 5.

FIG. 7 is a plot showing the central peak of the experimental data (for the case of the half-wave plate 540 at 45° ) compared with the theoretical expectation when the broadening contributions of (i) and (ii) above are taken into consideration. The fitting parameters $k''_s$ and $k''_i$ of the signal/idler radiations, $2.76 \times 10^{-28}$ and $2.96 \times 10^{-28}$ s$^2$/cm, respectively, are in agreement with the values specified by the manufacturer of the optical fiber.

By measuring the displacement of the central peak when the half-wave plate 540 is rotated from 0° to 45° ($\Delta t = 5432 \pm 1$ ps), and knowing the length of the fibers 560 and 570, the experimental value for D, using Eq. (7), was found to be $1799.9 \pm 0.4$ ps/km, in agreement with the parameters of the fibers 560 and 570. Substituting the estimated value of D into either Eq. (5) or Eq. (6), the time offset is measured to be $t_0 = 40369 \pm 1$ ps, which has the same order of accuracy of the $t_1-t_2$ measurement.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the present invention, as defined in the following claims.

What is claimed is:

1. A system for clock synchronization and position determination, comprising:
    an entangled photon source for generating entangled photon pairs and associated quantum mechanical probability amplitudes of directing one of the photons in each pair to a first clock positioned at a first location and the other photon in the pair to a second clock positioned at a second location; and a processor for synchronizing the first and second clocks by measuring second-order correlation functions of the entangled photon pairs based on arrival times of the photons at the first and second clocks and/or determining an unknown distance by measuring second-order correlation functions of the entangled photon pairs based on arrival times of the photons at the first and second clocks.

2. The system of claim 1, further comprising a communication channel at each of the first and second locations for communicating the arrival time information to the processor.

3. The system of claim 1, wherein the entangled photon source comprises a spontaneous parametric down conversion system.

4. The system of claim 1, further comprising:
   a first detector at the first location for detecting the one of the photons in each pair;
   a first event timer in communication with the first clock and the first detector for determining arrival times of the photons at the first detector and generating a first detection event history;
   a second detector at the second location for detecting the other photon in the pair; and
   a second event timer in communication with the second clock and the second detector for determining arrival times of the photons at the second detector and generating a second detection event history.

5. The system of claim 4, wherein the processor is capable of synchronizing the first and second clocks and/or determines the unknown distance based on the first and second detection event histories.

6. The system of claim 5, wherein the processor is capable of synchronizing the first and second clocks and/or determines the unknown distance based on a difference between the first and second detection event histories.

7. The system of claim 4, wherein the first and second detectors each comprise photon counters.

8. The system of claim 1, wherein the unknown distance comprises a distance between the entangled photon source and at least one of the first clock and the second clock.

9. The system of claim 1, wherein the unknown distance comprises r1 +r2, wherein r1 is a distance between the entangled photon source and the first clock, and r2 is a distance between the entangled photon source and the second clock.

10. A system for clock synchronization and position determination, comprising:
    an entangled photon source for generating entangled photon pairs and associated quantum mechanical probability amplitudes of directing one of the photons in each pair to a first clock positioned at a first location and the other photon in the pair to a second clock positioned at a second location;
    a first detector at the first location for detecting one of the photons in each pair;
    a first event timer in communication with the first clock and the first detector for determining arrival times of the photons at the first detector and generating a first detection event history;
    a second detector at the second location for detecting the other photon in the pair;
    a second event timer in communication with the second clock and the second detector for determining arrival times of the photons at the second detector and generating a second detection event history; and a processor for synchronizing the first and second clocks by measuring second-order correlation functions of the entangled photon pairs based on the first and second detection event histories and/or determining an unknown distance by measuring second-order correlation functions of the entangled photon pairs based on the first and second detection event histories.

11. The system of claim 10, further comprising a communication channel at each of the first and second locations for communicating the arrival time information to the processor.

12. The system of claim 10, wherein the entangled photon source comprises a spontaneous parametric down conversion system.

13. The system of claim 10, wherein the processor is capable of synchronizing the first and second clocks and/or determines the unknown distance based on a difference between the first and second detection event histories.

14. The system of claim 10, wherein the first and second detectors each comprise photon counters.

15. The system of claim 10, wherein the unknown distance comprises a distance between the entangled photon source and at least one of the first clock and the second clock.

16. The system of claim 10, wherein the unknown distance comprises r1 +r2, wherein r1 is a distance between the entangled photon source and the first clock, and r2 is a distance between the entangled photon source and the second clock.

17. A method for determining a synchronization state between a first clock at a first location and a second clock at a second location, comprising:
    generating a plurality of entangled photon pairs and associated quantum mechanical probability amplitudes of directing one of the photons in each pair to a first clock positioned at a first location and the other photon in the pair to a second clock positioned at a second location;
    generating a first detection event history based on arrival times of the photons at the first location;
    generating a second detection event history based on arrival times of the photons at the second location; and
    determining if the first and second clocks are synchronized by measuring second-order correlation functions of the entangled photon pairs based on a comparison of the first and second detection event histories.

18. The method of claim 17, further comprising synchronizing the first and second clocks based on a difference between the first and second detection event histories if it is determined that the first and second clocks are not synchronized.

19. The method of claim 18, wherein the first and second clocks are synchronized by:
    shifting one of the detection event histories until maximum detection coincidences are obtained between the first and second detection event histories; and
    adjusting one of the first and second clocks based on the shift required to obtain the maximum detection coincidences.

20. The method of claim 17, wherein the entangled photon pairs are generated by spontaneous parametric down conversion.

21. The method of claim 17, wherein the first and second detection event histories are brought together for comparison via at least one communication channel.

* * * * *